(12) United States Patent
Shaw

(10) Patent No.: US 8,298,425 B2
(45) Date of Patent: Oct. 30, 2012

(54) METHOD OF STAGGERED RELEASE OR EXPOSURE OF MICROORGANISMS FOR BIOLOGICAL REMEDIATION OF HYDROCARBONS AND OTHER ORGANIC MATTER

(76) Inventor: Mark D. Shaw, Ponte Vedra Beach, FL (US)

( * ) Notice: Subject to any disclaimer, the term of this patent is extended or adjusted under 35 U.S.C. 154(b) by 260 days.

(21) Appl. No.: 12/799,778

(22) Filed: Apr. 30, 2010

(65) Prior Publication Data

US 2010/0291660 A1    Nov. 18, 2010

Related U.S. Application Data

(63) Continuation-in-part of application No. 12/798,701, filed on Apr. 9, 2010, now abandoned.

(60) Provisional application No. 61/212,315, filed on Apr. 9, 2009, provisional application No. 61/215,151, filed on May 1, 2009.

(51) Int. Cl.
    *C02F 3/00* (2006.01)
(52) U.S. Cl. ........ 210/610; 210/615; 435/174; 435/175; 435/262.5
(58) Field of Classification Search .................. 210/610, 210/611, 615, 616; 435/174, 175, 262, 262.5, 435/264
See application file for complete search history.

(56) References Cited

U.S. PATENT DOCUMENTS

| | | | |
|---|---|---|---|
| 3,242,055 A | 3/1966 | DeLucia | |
| 3,860,490 A | 1/1975 | Guttag | |
| 4,810,385 A | 3/1989 | Hater et al. | |
| 5,275,943 A | 1/1994 | DiTuro | |
| 5,284,587 A * | 2/1994 | Wong et al. | 435/175 |
| 5,348,803 A | 9/1994 | Schlaemus et al. | |
| 5,567,324 A * | 10/1996 | Rothmel et al. | 435/262.5 |
| 5,807,724 A | 9/1998 | Resnick | |
| 5,820,762 A | 10/1998 | Bamer et al. | |
| 5,879,932 A | 3/1999 | Van Erdewyk et al. | |
| 5,925,252 A * | 7/1999 | Cline | 210/610 |
| 6,451,585 B1 * | 9/2002 | Kirschner | 435/262 |
| 6,573,087 B2 | 6/2003 | Lehr | |
| 7,166,221 B1 | 1/2007 | Young et al. | |
| 7,300,583 B1 * | 11/2007 | Heppenstall et al. | 210/610 |
| 7,479,221 B2 | 1/2009 | Paoluccio et al. | |

\* cited by examiner

*Primary Examiner* — Christopher Upton
(74) *Attorney, Agent, or Firm* — Thomas C. Saitta

(57) ABSTRACT

A methodology, and related systems and structures for accomplishing the methodology, of biological remediation of hazardous or undesirable organic matter, wherein a plurality of carrier members are disposed in a localized retaining member, the carrier members releasing or exposing microorganisms to the undesirable organic matter on a staggered basis over an extended period of time, the microorganisms being capable of biologically remediating the undesirable organic matter by utilizing the organic matter as a food source, thereby converting it into environmentally safe bi-products. Carrier members containing nutrients necessary for the survival of the microorganisms and having release times corresponding to the release times of the microorganisms are also provided to insure that the microorganisms remain viable upon release.

8 Claims, 2 Drawing Sheets

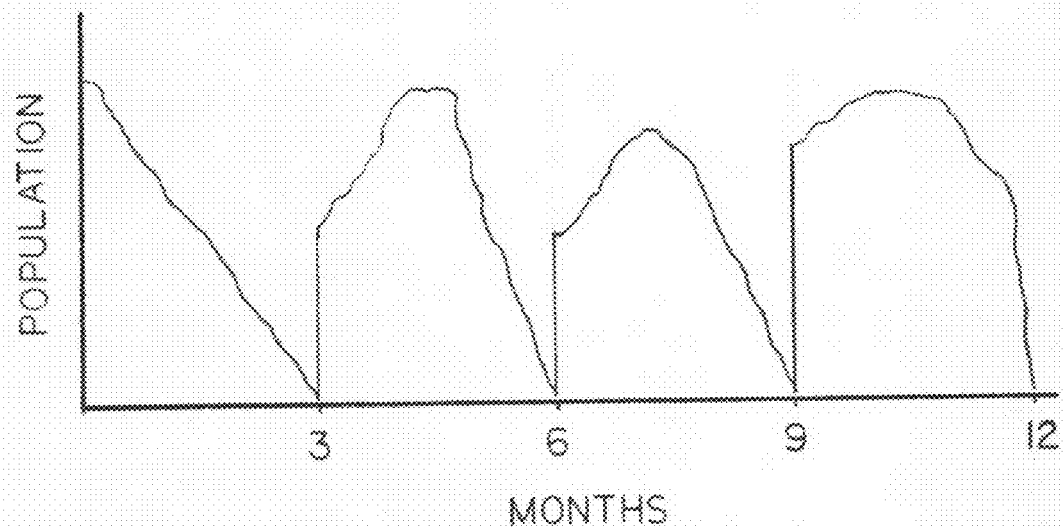

METHOD OF STAGGERED RELEASE OR EXPOSURE OF MICROORGANISMS FOR BIOLOGICAL REMEDIATION OF HYDROCARBONS AND OTHER ORGANIC MATTER

This application is a continuation-in-part of U.S. patent application Ser. No. 12/798,701, filed Apr. 9, 2010, now abandoned claiming the benefit of U.S. Provisional Patent Application Ser. No. 61/212,315, filed Apr. 9, 2009. This application also claims the benefit of U.S. Provisional Patent Application Ser. No. 61/215,151, filed May 1, 2009.

BACKGROUND OF THE INVENTION

This invention relates generally to the field of biological remediation, that is, the degradation of hydrocarbons and other organic matter utilizing microorganisms, primarily bacteria, to convert hazardous or undesirable organic matter into environmentally safe byproducts. More particularly, the invention relates to circumstances and applications where it is desirable to provide biological remediation on a long-term basis.

It is well known that microorganisms such as bacteria can be used to remediate undesirable or hazardous matter, waste products, pollution, etc. The microorganisms utilize the undesirable matter as a food source, converting the matter into safe byproducts that can be released into the environment. Such remediation has long been used in septic tank systems, where the microorganisms convert the human waste matter into non-harmful compositions that can be released into the environment. Many other circumstances can be remedied by biological remediation, including oil spills, grease traps, filters and the like, wherein the microorganisms are presented to the undesirable organic matter, such as when absorbent pads containing microorganisms are placed into water at the site of an oil spill, or wherein microorganisms are contained in absorbent filter media pads or bags located in a drain.

In many instances it is desirable to have the microorganisms present on an on-going, long-term basis, such as for example in storm water basin filters, where it is impossible to predict when oil or other hydrocarbons may be washed into the storm water system, or in filter drain traps in restaurants, where grease and oils are constantly being flushed into the drain. To address this, it is known to encase or encapsulate the microorganisms such that the coatings or binders dissolve or degrade over time, releasing or exposing the microorganisms in a generally steady manner over an extended period of time, often referred to as time release capsules or the like.

Examples of methodologies of biological remediation and devices incorporating microorganisms for biological remediation are disclosed for example in U.S. Pat. No. 3,242,055 to De Lucia, U.S. Pat. No. 3,860,490 to Guttag, U.S. Pat. No. 4,810,385 to Hater et al., U.S. Pat. No. 5,275,943 to DiTuro, U.S. Pat. No. 5,348,803 to Schlaemus et al., U.S. Pat. No. 5,807,724 to Resnick, U.S. Pat. No. 5,820,762 to Bamer et al., U.S. Pat. No. 5,879,932 to Van Erdewyk, U.S. Pat. No. 6,573,087 to Lehr, U.S. Pat. No. 7,166,221 to Young et al., and U.S. Pat. No. 7,429,221 to Paoluccio et al., the disclosures of which are expressly incorporated herein by reference, in particular to provide examples of formulations for encased or encapsulated microorganisms suitable for biological remediation.

All of the known systems utilize a time release mechanism for distributing or exposing the microorganisms to allow for remediation of the hazardous or undesirable hydrocarbons, and this presents a problem in many circumstances. Usually the colony of microorganisms present in a pad, filter or other carrier member has a limited lifespan, such that after a period of time the effectiveness of the biological remediation is diminished or eliminated entirely. This means that periodically the carrier member and its microorganisms must be removed and replaced by a new carrier member with a new colony of microorganisms. The costs to provide replacement carrier members and the labor costs involved in replacing the spent carrier members can be high, especially in circumstances where a large number of sites are involved. For example, in storm water systems wherein hydrocarbon-consuming microorganisms are provided as part of the filtering mechanism in storm drain basins, a given system will have hundreds or even thousands of storm drains. For systems containing microorganisms, a quarterly or monthly replacement of the microorganism-containing filters must be performed instead of the annual maintenance typically required to replace or clean the storm drain filter system in non-microbe-containing systems, thereby increasing the costs multi-fold.

It is an object of this invention to provide a methodology and related system and structures for accomplishing the methodology, whereby a plurality of carrier members, such as tablets, capsules or containers, containing microorganisms are retained in situ at locations where biological remediation of hazardous or undesirable organic matter may be required over extended periods of time, whereby the carrier members are structured such that the microorganisms within one or a first set of carrier members are released or exposed to begin remediation at one point in time, while the microorganisms within another one or a second set of carrier members are released or exposed to begin remediation at a later time than the first set, and the microorganisms within one or third set of carrier members are released are exposed to begin remediation at a later time than the second set, etc. It is another object to provide such a methodology and related systems and structures whereby the long-term staggered release or exposure of the microorganisms is customizable, such that the staggered release can be periodic, such as monthly or quarterly, or non-periodic in reaction to predictable changing conditions, such as varying seasonal requirements. It is another object of this invention to provide such a methodology and related systems and structures whereby nutrients, e.g., food and/or water, necessary for the survival of the microorganisms upon release are provided within the carrier members containing the microorganisms or are provided in companion carrier members, such that the food, nutrients or water are released in conjunction with the periodic release of the microorganisms, thereby ensuring the survival of the microorganisms in the event that no external food, nutrients or water are present in the environment upon their release.

SUMMARY OF THE INVENTION

A methodology, and related systems and structures for accomplishing the methodology, of biological remediation of hazardous or undesirable organic matter, such as hydrocarbons, including oil, grease and fats, human waste, etc., comprises in a broad sense providing a plurality of degradable carrier members in a localized retaining member that will release or expose microorganisms to the undesirable organic matter on a staggered basis (i.e., batch releases rather than continuous time release) over an extended period of time, the microorganisms being capable of biologically remediating the undesirable organic matter by utilizing the organic matter as a food source, thereby converting it into environmentally safe bi-products. The carrier members may be tablets, capsules, bags, containers, pouches, pads, mats, filters or any other suitable matrix or structure capable of retaining the microorganisms in a protected manner until it is desired for the microorganisms to remediate the organic matter.

Each carrier member has a predetermined time for initial release or exposure of the microorganisms retained therein, and the method comprises providing within the localized retaining member at least two batches of carrier members having different predetermined initial release or exposure times, such that a first batch of carrier members initially releases or exposes its microorganisms at one time, and the at least second batch of carrier members releases or exposes its microorganisms at a later time, thereby enabling the release or exposure of microorganisms within the retaining member to be staggered over a lengthy time period, such that when the remedial action of the first-released or exposed colony of microorganisms becomes ineffective, the second-released or exposed colony of microorganisms is activated for remediation. The staggering of the initial release or exposure of the batches of microorganisms can be periodic or non-periodic to address predicted circumstances, such as seasonal changes in average temperature or rainfall. In some instances the predetermined time of the additional releases may occur exactly when needed, but may overlap existing colonies or may be late in replacing dead colonies. However, this would be the case with maintenance of any system whereby a person is responsible for releasing more colonies into a system or application on various intervals.

The degradable carrier members may be structured in various known manner, such as by encasing the microorganisms within a binder material, encapsulating the microorganisms within a cover or shell, retaining the microorganisms within a container having a degradable sealing member, providing the microorganisms within a container having a mechanical release means, etc. The initial release or exposure time may be controlled by varying the thickness of the cover or shell material, choosing different binder or sealing materials that degrade at different rates, having a seal that degrades at a known rate, etc. The binder, shell or sealing materials may be chosen to degrade over time upon exposure to water, air, sunlight, etc.

In addition to staggered release of the microorganisms, corresponding staggered release of nutrients, e.g., food and/or water stored in tablets, capsules, bags, containers, pouches, pads, mats, filters or any other suitable matrix or structure capable of retaining the nutrients in a protected manner until it is desired for release is also provided for. The release of the nutrients is timed to match the release times of the microorganism groups, such that viability of the newly released microorganisms is guaranteed regardless of the environmental conditions present at the time of release.

BRIEF DESCRIPTION OF THE DRAWINGS

FIG. 5 is a graph showing the population of microorganisms at different points in time relative to staggered releases.

DETAILED DESCRIPTION OF THE INVENTION

The invention is general is a methodology, and related systems and structures for accomplishing the methodology, of biological remediation of hazardous or undesirable organic matter, such as hydrocarbons, including oil, grease and fats, human waste, etc., comprising in a broad sense providing a plurality of degradable carrier members in a localized retaining member or simply loose over a general area, the carrier members releasing or exposing relatively large groups of microorganisms to the undesirable organic matter on a staggered (i.e., batch releases rather than continuous time release) basis over an extended period of time, the microorganisms being capable of biologically remediating the undesirable organic matter by utilizing the organic matter as a food source, thereby converting it into environmentally safe bi-products.

Figure 4:
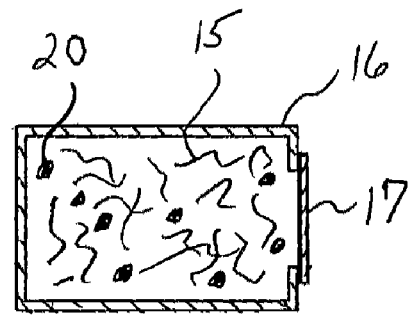
FIG. 4 is a cross-sectional view of a non-degradable container member having a degradable seal member for release or exposure of the microorganisms and nutrients.
Figure 2:
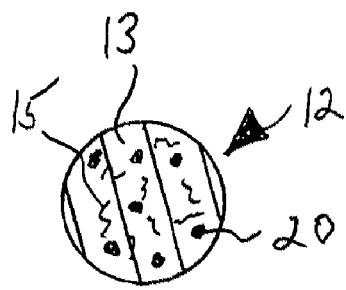
FIG. 2 is a cross-sectional view of an encased carrier member wherein the microorganisms and nutrients are mixed with the binder material.
Figure 3:
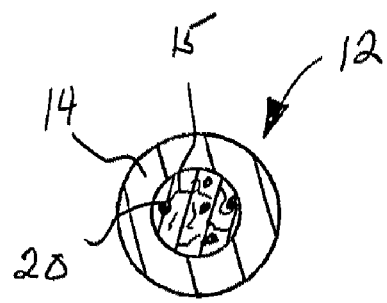
FIG. 3 is a cross-sectional view of an encapsulated carrier member wherein the microorganisms and nutrients are encapsulated within a binder material.

The carrier members 12 may be tablets, capsules, bags, containers, pouches, pads, mats, filters or any other suitable matrix or structure capable of retaining the microorganisms 15 in a protected manner until it is desired for the microorganisms 15 to remediate the organic matter. The carrier members 12 may be structured in various known manner, such as by encasing the microorganisms 15 within a binder material 13, as shown in FIG. 2, encapsulating the microorganisms 15 within a cover or shell binder 14, as shown in FIG. 3, retaining the microorganisms 15 within a non-degradable container 16 having a degradable sealing member 17, as shown in FIG. 4, providing the microorganisms 15 within a container having a mechanical release means, etc. The initial release or exposure time may be controlled by varying the thickness of cover or shell material, choosing different binder or sealing materials that degrade at different rates, etc. The binder, shell or sealing materials may be chosen to degrade over time upon exposure to water, air, sunlight, etc.

For example, microorganisms 15 may be mixed with natural or synthetic binder materials such as a water soluble glue, a hydrophilic acrylate, a cellulose, polyethylene glycol, starch-based polyethylene, alginates, caseinares, wax, etc., to form tablets, pellets or the like, whereby the encasing binder material degrades or dissolves over time to release or expose the microorganisms 15, such that the microorganisms 15 are able to feed on and remediate organic matter. In similar manner, the microorganisms 15 may be encapsulated within shells formed of the same type of materials as listed. There are many known microorganisms 15 that may be utilized, the particular microorganism 15 being chosen based on the organic matter to be remediated and other conditions. Some examples of possible suitable microorganisms 15 include bacterium from the genus *Pseudomonas* containing plasmids for providing hydrocarbon degradative pathways and bacterium from the genus *Vibrio, Micrococcus, Bacillus, Arthrobacter, Nocardia,* and *Corynebacterium.*

Each carrier member 12 has a predetermined time for initial release or exposure of the microorganisms 15 retained therein, and the method comprises providing within the localized retaining member 11 at least two batches of carrier members 12 having different predetermined initial release or exposure times, such that a first batch of carrier members 12 initially releases or exposes its microorganisms 15 at one time, and the at least second batch of carrier members 12 releases or exposes its microorganisms 15 at a later time, thereby enabling the release or exposure of microorganisms 15 within the retaining member 11 to be staggered over a lengthy time period, such that when the remedial action of the first-released or exposed colony of microorganisms 15 becomes ineffective, the second-released or exposed colony of microorganisms 15 is activated for remediation activity. The staggering of the initial release or exposure of differing colonies of microorganisms 15 can be periodic (e.g., every three months) or non-periodic (e.g., March-June-September-March) to address predicted or anticipated circumstances. For example, a given group of microorganisms 15 may be stored in a dormant state for multiple years, yet have a maximum natural life of 90 days after release, at which time the colony dies out. A system may be provided wherein four groups of carrier members 12 are provided, the first group of carrier members 12 releasing a first group of microorganisms 15 immediately upon placement, the second group of carrier members 12 releasing a second group of microorganisms 15 in three months, the third group of carrier members 12 releasing a third group of microorganisms 15 in six months, and the fourth group of carrier members 12 releasing a fourth group of microorganisms 15 in nine months, as shown graphically in FIG. 5. Thus the system would not need to be recharged with microorganisms 15 until one year had passed.

Figure 1:
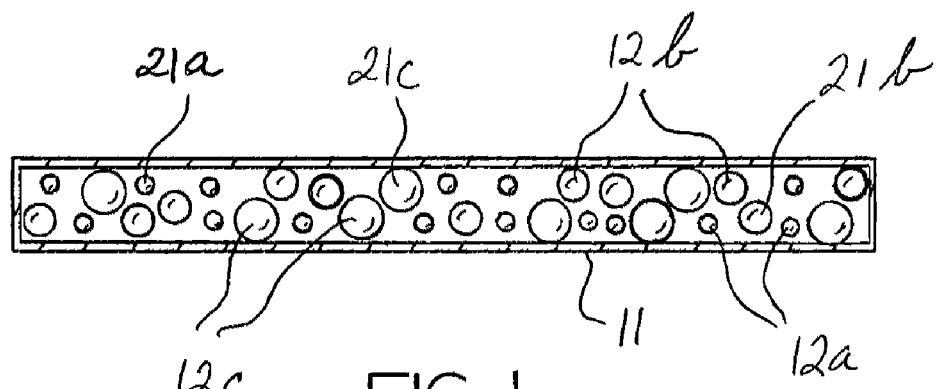
FIG. 1 is an illustrative view of a representative embodiment of a retaining member in the form of a pad or envelope containing microorganism and nutrient carrier members of differing sizes.

A representative example of a suitable system for practicing the method is shown in FIG. 1, wherein a non-degrading retaining member 11 in the form of a water permeable pad or envelope contains a plurality of carrier members 12a, 12b and 12c consisting of shell members encapsulating microorganisms 15. The carrier members 12a, 12b, and 12c are shown as having different sizes, signifying that the thickness of the carrier members 12 determines the time period for release or exposure of the microorganisms 15. The retaining member 11 may for example be inserted into a storm water catch basin filter apparatus such that water passing into the catch basin must pass through or contact the retaining member 11. For example, the initial batch of carrier members 12a may release or expose the microorganisms 15 virtually immediately upon being contacted by water, whereas the second batch of carrier members 12b, being of greater shell thickness, will not release or expose the microorganisms 15 until approximately 3 months after contact with water, and the third batch of carrier members 12c, being of even greater shell thickness, will not release or expose the microorganisms 15 until approximately 6 months after contact with the water. In this manner, when the bioremedial effectiveness of the microorganisms 15 within carrier member 12a has diminished due to natural decline, exposure to environmental contaminants, etc., a new colony of microorganisms 15 in carrier members 12b is released to automatically begin remediation action without requiring manual replacement of the retaining member 11. For example, in certain applications, temperature extremes can kill off the microorganisms 15, thereby shutting down the remediation process or effectiveness. Also environmental situations, such as heavy rain events, could cause the microorganisms 15 to be washed away. The predominant method for overcoming these challenges is to reseed or replenish the carrier device, filter media or other type of device with more microorganisms. This maintenance of the systems is usually an expensive endeavor, and is not necessary with the methodology disclosed herein.

It is possible that the release or exposure of the initial or subsequent batches of microorganisms 15 will occur at a time wherein the environment does not provide suitable nutrients 20, e.g., food and/or water, for survival of the microorganisms 15. This can be a major drawback to the automatic release systems discussed herein. To insure that the colonies of microorganisms 15 remain viable upon release or exposure, a corresponding staggered release of nutrients 20 stored in tablets, capsules, bags, containers, pouches, pads, mats, filters or any other suitable matrix or structure capable of retaining the nutrients 20 in a protected manner until it is desired for release is also provided for. The release of the nutrients 20 is timed to match the release times of the colonies of microorganisms 15, such that viability of the newly released microorganisms 15 is guaranteed regardless of the environmental conditions present at the time of release. Preferably, the nutrients 20 are stored in degradable nutrient carrier members 21 matching the carrier members 12 containing the microorganisms 15, such that the staggered release or exposure of each batch of microorganisms 15 and their corresponding nutrients 20 occur at the same time. For example, as shown in FIG. 1, nutrient carrier members 21a, 21b and 21c are provided, with the release time of the nutrient carrier member 21a corresponding to the release time of carrier member 12a, the release time of the nutrient carrier member 21b corresponding to the release time of carrier member 12b, and the release time of the nutrient carrier member 21c corresponding to the release time of carrier member 12c. Alternatively, the microorganism 15 carrier member or members 12 may also retain the nutrients 20, as shown in FIGS. 2 and 3.

The methodology may also be described in detail as follows, the invention comprising a method of biological remediation of hazardous or undesirable organic matter utilizing microorganisms 15, comprising the steps of determining a particular hazardous or undesirable organic matter to be remediated; selecting suitable microorganisms 15 for remediating said organic matter, said microorganisms 15 remediating said organic matter by utilizing said organic matter as a food source; determining a desired batch release schedule for said microorganisms 15; encapsulating a first batch of said microorganisms in a degradable first carrier member 12a, such that said first batch of microorganisms 15 is released upon degradation of said first carrier member 12a after a first time period; encapsulating a second batch of said microorganisms 15 in a degradable second carrier member 12b, such that said second batch of microorganisms 15 is released upon degradation of said second carrier member 12b after a second time period, said second time period being greater than said first time period; positioning said first and second batches at a location wherein said organic matter encounters said released microorganisms 15; determining nutrients 20 suitable for maintaining the viability of said microorganisms 15; encapsulating a first batch of said nutrients 20 in a degradable first nutrient carrier member 21a, such that said first batch of nutrients 20 is released when said first batch of microorganisms 15 is released after said first time period; and encapsulating a second batch of said nutrients 20 in a degradable second nutrient carrier member 21b, such that said second batch of nutrients 20 is released when said second batch of microorganisms 15 is released after said second time period. The method may further comprise the step of retaining said first and second batches of microorganisms 15 and said first and second batches of said nutrients 20 within a nondegradable retaining member 11.

Alternatively, the invention comprises a method of biological remediation of hazardous or undesirable organic matter utilizing microorganisms 15, comprising the steps of providing a first batch and second batch of microorganisms 15 and a first and second batch of nutrients 20 suitable for sustaining said microorganisms 15; simultaneously releasing said first batch of said microorganisms 15 and said first batch of said nutrients 20; and at a later time, simultaneously releasing said second batch of said microorganisms 15 and said second batch of said nutrients 20. The method may further comprise the steps of retaining said first batch of said microorganisms 15 and said first batch of said nutrients 20 in at least one degradable carrier member 21*a*; and retaining said second batch of said microorganisms 15 and said second batch of said nutrients in at least one other degradable carrier member 21*b*. The method may further comprise the step of retaining said first and second batches of microorganisms 15 and said first and second batches of nutrients 20 within a nondegradable retaining member 11.

It is understood and contemplated that substitutions and equivalents for certain elements set forth above may be obvious to those skilled in the art, and therefore the true scope and definition of the invention is to be as set forth in the following claims.

I claim:

1. A method of biological remediation of hazardous or undesirable organic matter utilizing microorganisms, comprising the steps of:
    providing a first encapsulated batch and second encapsulated batch of microorganisms and a first encapsulated batch and second encapsulated batch of nutrients suitable for sustaining said microorganisms in the event insufficient organic matter is present upon release of said first or second encapsulated batch of microorganisms;
    simultaneously releasing said first batch of microorganisms and said first batch of nutrients; and
    at a predetermined later time, simultaneously releasing said second batch of microorganisms and said second batch of nutrients;
    wherein said later time is chosen to occur after the expected period of remedial effectiveness of said first batch of microorganisms.

2. The method of claim 1, further comprising the steps of:
    retaining said first batch of microorganisms and said first batch of nutrients in at least one degradable carrier member; and
    retaining said second batch of microorganisms and said second batch of nutrients in at least one other degradable carrier member.

3. The method of claim 2, further comprising the step of retaining said first and second batches of microorganisms and said first and second batches of nutrients within a nondegradable retaining member.

4. A method of biological remediation of hazardous or undesirable organic matter utilizing microorganisms, comprising the steps of:
    determining a particular hazardous or undesirable organic matter to be remediated;
    selecting suitable microorganisms for remediating said organic matter, said microorganisms remediating said organic matter by utilizing said organic matter as a food source, said microorganisms being selected from a group of microorganisms consisting of microorganisms able to remain dormant when encapsulated;
    encapsulating a first batch of said microorganisms in an environmentally degradable first carrier member, said first carrier member adapted to simultaneously release the entire said first batch of microorganisms at a predetermined first release time upon initial exposure of said first carrier member to an environment in which said first carrier member degrades;
    encapsulating a second batch of said microorganisms in an environmentally degradable second carrier member, said second carrier member adapted to simultaneously release the entire said second batch of microorganisms at a predetermined second release time upon exposure of said second carrier member to an environment in which said second carrier member degrades;
    wherein the time period from said initial exposure of said first carrier member to said second release time is greater than the time period from said initial exposure of said first carrier member to said first release time, and wherein the difference between said time periods is chosen to correspond to the expected period of efficacious remediation of said organic matter by said first batch of said microorganisms;
    determining nutrients suitable for maintaining the viability of said microorganisms upon release of said microorganisms from said first and second carrier members;
    encapsulating a first batch of said nutrients in a degradable first nutrient carrier member, such that said first batch of nutrients is released simultaneously with said first batch of said microorganisms, said nutrients being sufficient to sustain said first batch of said microorganisms in the event an insufficient amount of organic matter is present upon release of said first batch of said microorganisms; and
    encapsulating a second batch of said nutrients in a degradable second nutrient carrier member, such that said second batch of nutrients is released simultaneously with said second batch of said microorganisms, said nutrients being sufficient to sustain said second batch of said microorganisms in the event an insufficient amount of organic matter is present upon release of said second batch of said microorganisms;
    exposing said first and second carrier members and said first and second nutrient carrier members to an environment capable of degrading said first and second carrier members and said first and second nutrient carrier members such that said microorganisms are released to feed upon said organic matter.

5. The method of claim 4, further comprising the step of retaining said first and second carrier members and said first and second nutrient carrier members within a nondegradable retaining member.

6. The method of claim 4, wherein said first carrier member and said first nutrient carrier member comprise a single member, and wherein said second carrier member and said second nutrient carrier member comprise a single member.

7. A method of biological remediation of hazardous or undesirable organic matter utilizing microorganisms, comprising the steps of:
    determining a particular hazardous or undesirable organic matter to be remediated;
    selecting suitable microorganisms for remediating said organic matter, said microorganisms remediating said organic matter by utilizing said organic matter as a food source, said microorganisms being selected from a group of microorganisms consisting of microorganisms able to remain dormant for extended periods of time when encapsulated;
    encapsulating a first batch of said microorganisms in an environmentally degradable first carrier member, said first carrier member adapted to simultaneously release the entire said first batch of microorganisms at a predetermined first release time upon initial exposure of said first carrier member to an environment in which said first carrier member degrades, said first batch of said microorganisms upon release forming a colony having an expected period of efficacious remediation, after which said colony will die out;
    encapsulating a second batch of said microorganisms in an environmentally degradable second carrier member, said second carrier member adapted to simultaneously release the entire said second batch of microorganisms at a predetermined second release time upon exposure of said second carrier member to an environment in which said second carrier member degrades, said second batch of said microorganisms upon release forming a second colony having an expected period of efficacious remediation, after which said colony will die out;

wherein the time period from said initial exposure of said first carrier member to said second release time is greater than the time period from said initial exposure of said first carrier member to said first release time, and wherein the difference between said time periods is chosen to correspond to said expected period of efficacious remediation of said organic matter by said first colony of said microorganisms;

exposing said first and second carrier members to an environment whereby said first and second carrier members degrade to release said microorganisms to feed upon said organic matter.

8. The method of claim 7, further comprising the step of retaining said first and second carrier members within a non-degradable retaining member.

* * * * *